US 6,757,736 B1

(12) United States Patent
Hutchison et al.

(10) Patent No.: US 6,757,736 B1
(45) Date of Patent: Jun. 29, 2004

(54) BANDWIDTH OPTIMIZING ADAPTIVE FILE DISTRIBUTION

(75) Inventors: Robert Brian Hutchison, Raleigh, NC (US); Donald Arthur Richards, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,166

(22) Filed: Nov. 30, 1999

(51) Int. Cl.⁷ .................. G06F 15/16; G06F 15/173
(52) U.S. Cl. ........................... 709/232; 709/238
(58) Field of Search ................. 709/203, 200, 709/205, 230, 232, 245, 238, 226, 220, 223, 250; 705/40; 370/352, 464, 60, 425; 714/748

(56) References Cited

U.S. PATENT DOCUMENTS

| | | | | |
|---|---|---|---|---|
| 5,511,168 A | * | 4/1996 | Perlman et al. | 709/243 |
| 5,646,676 A | | 7/1997 | Dewkett et al. | 348/7 |
| 5,799,150 A | | 8/1998 | Hamilton et al. | 395/200.33 |
| 5,845,280 A | | 12/1998 | Treadwell, III et al. | 707/8 |
| 5,884,325 A | * | 3/1999 | Bauer et al. | 705/40 |
| 5,905,871 A | * | 5/1999 | Buskens et al. | 709/245 |
| 6,128,653 A | * | 10/2000 | del Val et al. | 709/203 |
| 6,151,696 A | * | 11/2000 | Miller et al. | 714/748 |
| 6,256,673 B1 | * | 7/2001 | Gayman | 370/352 |
| 6,405,236 B1 | * | 6/2002 | Nieratschker | 709/200 |
| 6,418,141 B1 | * | 7/2002 | Votava | 370/390 |

FOREIGN PATENT DOCUMENTS

JP          10-320261 A        12/1998

OTHER PUBLICATIONS

Davis, System and method of multicasting data messages, Feb. 6, 2003, US 2003/0028632 A1.*

* cited by examiner

Primary Examiner—John Follansbee
Assistant Examiner—Kenny Lin
(74) Attorney, Agent, or Firm—J. Bruce Shelkopf, Esq.; Steven M. Greenberg, Esq.; Christopher & Weisberg, P.A.

(57) ABSTRACT

The present invention is an adaptive file distribution method for choosing a transmission protocol in order to optimize network and processor bandwidth according to the number of client nodes active on the data distribution network. Specifically, a method for adaptively selecting a transport protocol for transmitting data segments across a distributed data network can include the steps of: determining the number and identity of subordinate nodes on the network that will receive the data segment; selecting a data transport protocol according to the number of subordinate nodes determined; and, transmitting the data segment to the subordinate nodes using the selected transport protocol. Significantly, the transport protocol is selected from the group consisting of a connection-oriented protocol and a connectionless protocol. Moreover, the connection-oriented protocol can be the Transport Control Protocol, whereas the connectionless protocol can be the Universal Datagram Protocol.

21 Claims, 6 Drawing Sheets

```
for (each file that needs to be reconciled)
{
    open_the_file();
    size = get_size_of_file();

while (size > 0)
    {
        // construct message of header and up to 32k of data.
        message = read_up_to_32k_from_file();

if (size > 32k)
            size = size - 32k;
        else
            size = 0;

if (number_of_active_nodes < = 4)
        {
            Send_message_pt_to_pt();
        }
        else // number of nodes is greater than 4
        {
            if (message_size > 1k)
            {
                // Fragment message into 1k slices.
                for (each 1k slice of data)
                {
                    Bcast_message();
                }
            }
            else   // message < = 1k
                Bcast_message();
        }

// Done with this file, so close handle.
    close_file();
}
```

FIG. 8

BANDWIDTH OPTIMIZING ADAPTIVE FILE DISTRIBUTION

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of distributed data services and more particularly to a method and apparatus for bandwidth optimizing adaptive file distribution.

2. Description of the Related Art

A fundamental operation executed by file servers in a distributed data network is the transmission of a file from a first storage location to a specified destination or set of destinations. For example, in a typical distributed data network, a file server can service requests from network client nodes for file data stored on a secondary storage device such as a hard disk drive. Special cases of distributed data networks can include, for example, multimedia server systems for providing on-demand multimedia, real-time financial data systems, and retail point-of-sale (POS) systems which can support retail purchase transactions.

Present retail POS systems can capitalize on a distributed software platform for sharing centrally stored and maintained data pertaining to the retail store environment. Typical shared data can include retail good information, pricing structure, employee data, and translation tables for use with bar code scanning systems. For instance, although retail good pricing tables may be maintained and stored on a central file server in a distributed POS system, each POS client node, typically residing in a retail store check-out aisle, can require local use of the pricing tables in order to properly record the sale of a retail good. Thus, the central file server must update each POS client node by distributing the pricing tables from the central file server to each POS client node as necessary.

The IBM StorePlace® Distributed Data Services® (Distributed Data Services) software platform, manufactured by International Business Machines Corporation of Armonk, N.Y., is an example of a distributed software platform designed to be used as a base for the development of distributed applications for the retail store environment. The main functions of the Distributed Data Services software platform include: interprocess communication, data access, directory services, and data distribution for redundancy, performance, and availability. The data distribution component of the Distributed Data Services software platform provides a file distribution service that can replicate data to multiple client nodes forming an image of the centrally stored data on each client node. The data distribution component can ensure the synchronization of each image of the centrally stored data during normal system operations. Furthermore, the data distribution component can perform file reconciliation when failed client nodes are brought back into service.

In a typical installation of a data distribution component, a primary distributor can centrally store prime copies of distributed files. The prime copy of a distributed file is the only copy of the file that can be changed or updated. As the prime copy of a distributed file is updated, renamed, or deleted, the changes are distributed to all client nodes having an image of that file. In addition to file distribution, the data distribution component can provide a reconciliation service. The reconciliation service can ensure that, if a client node misses updates for any reason, each distributed file on the node is re-synchronized with the prime copy of the file when communication is reestablished with the primary distributor.

Existing methods of data distribution utilize the User Datagram Protocol (UDP) in order to broadcast segments of a distributed file to client nodes in a distributed data network. UDP is a connectionless transmission protocol defined in the Request for Comment, RFC 768—User Datagram Protocol. UDP is an application interface to the Internet Protocol (IP) which serves as a multiplexer/demultiplexer for sending and receiving datagrams using ports to direct the datagrams. The application interface offered by UDP provides for the creation of new receive ports, a receive operation that returns the data bytes and an indication of the source port and the source IP address, and a send operation that has as parameters the data and the source and destination ports and addresses.

The UDP distribution technique, primarily because of its connectionless orientation, can be an efficient file distribution technique for a data distribution network having many client nodes included within the data distribution network. However, depending upon the underlying operating system, the UDP frame size can limit the size of transmitted file segments to 1 kilobyte (K). The 1 K limitation can compel the fragmentation of a 32 K file segment into individual 1 K segments. As a result, to broadcast a 32 K file segment from a primary distributor to the client nodes using UDP can consume 35 transmission cycles. This limitation can prove especially inadequate where a large file is broadcast to a single workstation.

For example, in a retail store setting during a re-synching operation between a primary distributor and a single client node, the distributed file can be a 50 megabyte (MB) bar code translation table containing store inventory. In that instance, a communications protocol capable of accommodating a larger frame size thus avoiding the fragmentation of each file segment would prove substantially more efficient. One such connection-oriented communications protocol, the Transport Control Protocol (TCP), is defined in the Request for Comment, RFC 793—Transport Control Protocol. Hence, what is needed is an adaptive file distribution method for choosing a transmission protocol in order to optimize network and processor bandwidth according to the number of client nodes active on the distributed data network.

SUMMARY OF THE INVENTION

The present invention is an adaptive file distribution method for intelligently choosing a transmission protocol in order to optimize network and processor bandwidth according to the number of client nodes active on the data distribution network. Specifically, a method for adaptively selecting a transport protocol for transmitting data segments across a distributed data network can include the steps of: determining the number and identity of subordinate nodes on the network that will receive the data segment; selecting a data transport protocol according to the number of subordinate nodes; and, transmitting the data segment to the subordinate nodes using the selected transport protocol. Significantly, the transport protocol preferably is selected from the group consisting of a connection-oriented protocol and a connectionless protocol.

In the preferred embodiment of the present invention, the determining step can comprise the steps of: initializing a counter in a primary distributor on the distributed data network; receiving in the primary distributor a request for data from subordinate nodes on the network; and, responsive to the request, incrementing the counter. In particular, each subordinate node periodically can request updated data from the primary distributor. As a result, the counter reflects the number of subordinate nodes on the network which require, at the time of a file update, the corresponding updated data. Alternatively, the determining step can comprise the steps of: initializing a counter in the primary distributor; identifying each active subordinate node on the network; and, for each identified active subordinate node, incrementing the counter.

Advantageously, the selecting step can comprise the steps of: selecting a connectionless transport protocol if the number of subordinate nodes exceeds four nodes. Otherwise, a connection-oriented transport protocol can be selected. In the preferred embodiment, the connectionless transport protocol is the Universal Datagram Protocol. Furthermore, in the preferred embodiment, the connection-oriented transport protocol is the Transport Control Protocol.

In the preferred embodiment, the transmitting step can vary depending upon the selected transport protocol. If a connectionless transport protocol is selected, the transmitting step can include broadcasting the data segment to the subordinate nodes using the connectionless transport protocol. Otherwise, if a connection-oriented transport protocol is selected, the transmitting step can include establishing a point-to-point connection with each subordinate node and subsequently writing the data segment to each subordinate node. If a connectionless transport protocol is selected, the broadcasting step can comprise the steps of: fragmenting the data segment into one kilobyte (1 K) slices of data; and, repeatedly transmitting the 1 K slices of data onto the network until all of the 1 K slices have been transmitted.

In the preferred embodiment, both connection-oriented and connectionless transport techniques can be used for distributing file updates and performing file reconciliation across a distributed data network. As such, a method for adaptively distributing file updates and performing file reconciliation in a distributed data network can comprise the steps of: updating a prime copy of a file residing on a primary distributor; and responsive to the update, identifying at least one subordinate node requesting the updated file.

If the number of identified subordinate nodes exceeds a threshold number, the updated file can be broadcast to the identified subordinate nodes. Otherwise, a point-to-point connection with each identified subordinate node can be established. Furthermore, the updated file can be transmitting to each identified subordinate node using the point-to-point connection.

Experimentally, it has been determined that if a file to be transmitted is to be transmitted to four or fewer subordinate client nodes, a connection-oriented protocol is an optimal choice in view of the larger frame size capabilities of the TCP protocol. Consequently, in the preferred embodiment, the broadcasting step can include the steps of: selecting a connectionless transport protocol for transmitting the updated file to the identified subordinate nodes if the number of identified subordinate nodes exceeds four subordinate nodes, and, transmitting the updated file to the identified subordinate nodes using the connectionless transport protocol. Advantageously, the connection transport protocol can be the Universal Datagram Protocol. Conversely, the establishing step can include: selecting a connection-oriented transport protocol for transmitting the updated file to the identified subordinate nodes if the identified subordinate nodes does not exceed four subordinate nodes; establishing a point-to-point connection with each identified subordinate node; and, transmitting the updated file to each identified subordinate node using the connection-oriented transport protocol. Advantageously, the connection-oriented transport protocol can be the Transport Control Protocol. Thus, by adaptively choosing an appropriate transport protocol, the inventive adaptive file distribution algorithm can optimize network and processor bandwidth in a distributed data network.

BRIEF DESCRIPTION OF THE DRAWINGS

There are presently shown in the drawings embodiments which are presently preferred, it being understood, however, that the invention is not limited to the precise arrangements and instrumentalities shown.

FIG. 8 is a pseudo source code listing of a method for adaptive file distribution.

DETAILED DESCRIPTION OF THE INVENTION

The preferred embodiment can best be described in context of its incorporation into the above-referenced IBM StorePlace Distributed Data Services software platform. Notwithstanding, the invention is not limited in this regard. Rather, the inventive method can be incorporated into any distributed data network having, as an affiliated operation, the transmission of a file from a first storage location to a specified destination or set of destinations. In particular, the inventive method can optimize network and processor bandwidth when included in any distributed data network, in which a file server can service requests from network client nodes for file data stored on a secondary storage device such as a hard disk drive.

Figure 1:
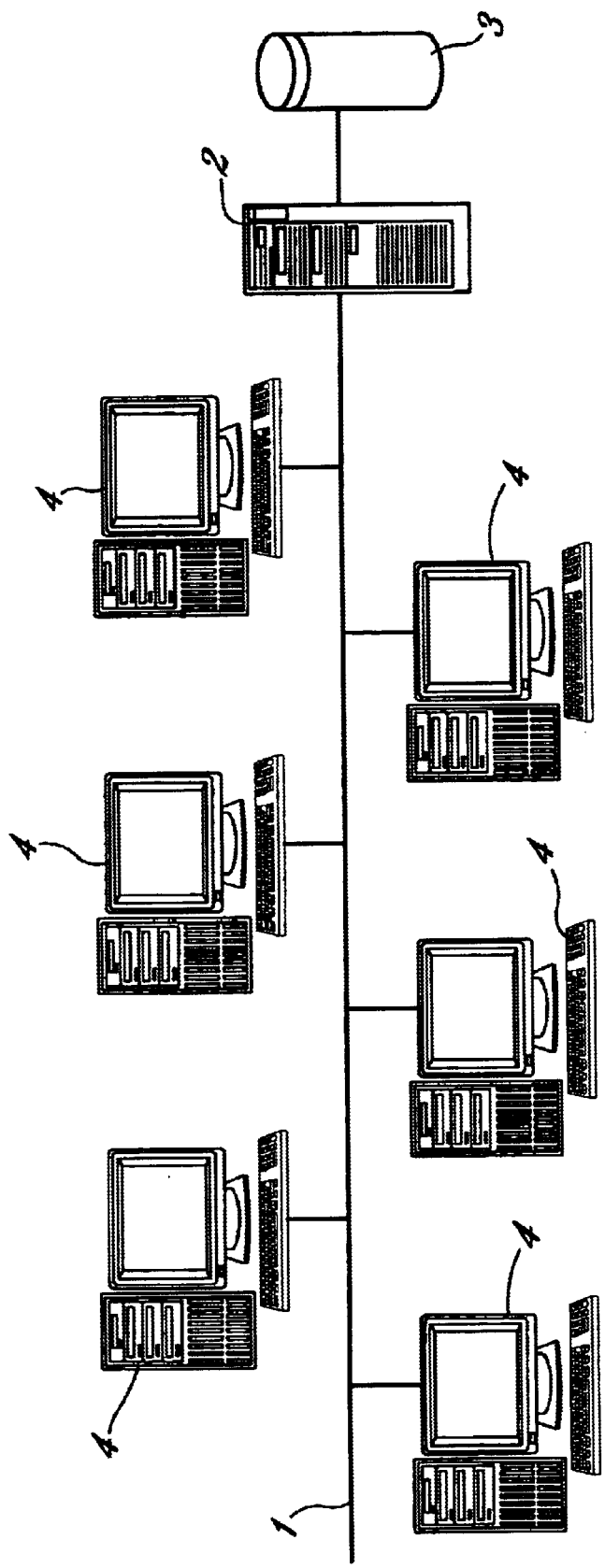
FIG. 1 is a schematic representation of a typical distributed data network.

An exemplary distributed data network is shown in FIG. 1. The typical distributed data network 1 can include a file server 2 having operatively connected thereto, a fixed storage 3 for storing a prime copy of a distributed file. Attached to the distributed data network are client nodes 4. Although, in the Distributed Data Services software platform, each client node 4 can be a subordinate or backup client node for use in a POS system, the invention is not limited in this regard. Rather, the client node 4 can be, for example, a personal computer in a distributed multimedia network, or a financial services kiosk station in a real-time financial services system. Thus, the inventive method can prove beneficial to several special cases of distributed data networks including multimedia server systems for providing on-demand multimedia, real-time financial data systems, and retail point-of-sale (POS) systems which can support retail purchase transactions.

Figure 2:
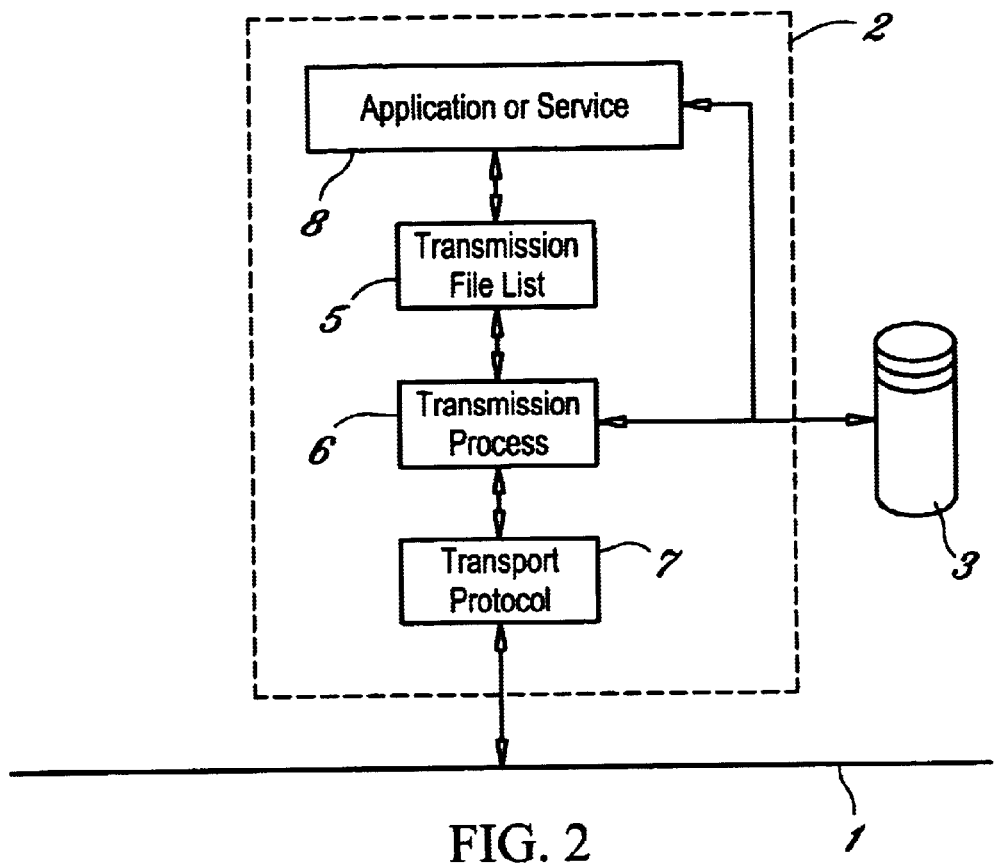
FIG. 2 is a schematic representation of data distribution system residing on a file server as shown in FIG. 1.

In the Distributed Data Services software platform, each image of a prime copy of a distributed file residing on the fixed storage 3 can be updated as determined by an application or service 8 running in the file server 2 as shown in FIG. 2. Once the application 8 has determined that the images residing on the subordinate client nodes 4 require synchronization, the application 8 can insert a reference to the file in a transmission file list 5. A transmission process 6, executing within its own thread, can detect the newly inserted file reference, extract a copy of the file from the fixed storage 3, and can transmit the copy to the subordinate client nodes 4 on the distributed data network 1. Advantageously, in accordance with the inventive method, the transmission process 6 can select an appropriate transport protocol 7 in order to optimize the transmission of the file.

The preferred embodiment preferably employs the Internet protocol (IP) for implementing node to node communications. IP is a layered protocol, designed to facilitate the exchange of data between two applications on two different nodes. IP based communications operate among layers using either connectionless or connection-oriented methods. Connection-oriented communications are reliable to the extent that when two nodes are communicating, each maintains an awareness of the other's activities. In contrast, in connectionless communications, the sending node does not inform the receiving node when data has been transmitted. Furthermore, the receiving node does not acknowledge or deny the receipt of the transmitted data.

Figure 3:
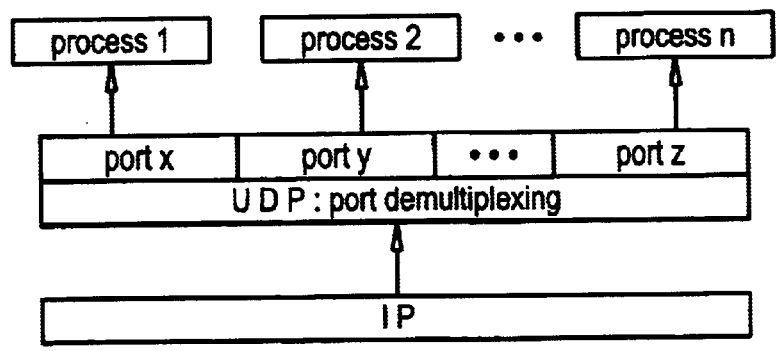
FIG. 3 is a hierarchical diagram of the Universal Datagram Protocol (UDP) with respect to the Internet Protocol and higher level receiving processes.

The universal datagram protocol (UDP) represents a common connectionless transport protocol. As shown in FIG. 3, UDP essentially is an application interface to IP. UDP adds no reliability, flow-control or error recovery to IP. Unlike a connection-oriented protocol, neither of the two UDP communicating nodes maintains an awareness of the transmission state of the other node. In particular, the sending node does not inform the receiving node when data has been transmitted. Likewise, the receiving node does not acknowledge or deny the receipt of the transmitted data. UDP simply serves as a multiplexer/demultiplexer for sending and receiving datagrams using ports to direct the datagrams to an appropriate receiving process.

Figure 4:
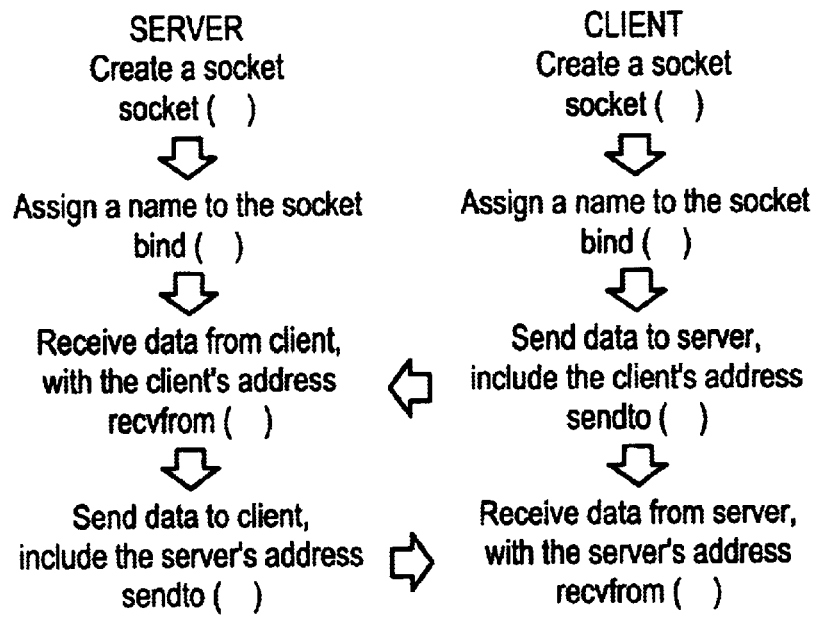
FIG. 4 is a sequence diagram of a typical, connectionless UDP based broadcast communications sequence between a client and a server.

FIG. 4 illustrates a typical, connectionless UDP based broadcast communications sequence between a client and a server. As shown in the figure, initially, both the client and the server establish a socket through which each can communicate. Additionally, both the client and the server assign a name to the established socket. The socket model can provide a process with a full-duplex byte stream connection to another process. A socket is itself a pair of numbers: IP address and port. First, because an IP connection is limited to two nodes, the IP addresses of both nodes are required. Second, because the transport layer identifies the connection by source and destination port, the port identifiers are required. Specifically, a port is a 16-bit number, used by the host-to-host protocol to identify to which higher-level protocol or process (application program) the protocol must deliver incoming messages. Hence, in order to initiate a new connection, both the IP address of the destination node and the port on which the desired application program is "listening" are required.

When the server communicates with the client, the server merely broadcasts a message and message header onto the network. The message header identifies the intended destination by denoting the intended client IP address. Each client attached to the network can scan the transmitted header to determine if the client is the intended recipient. Of course, the process works equivalently in the instance where the client initiates communications with the server. Notably, neither the client nor the server acknowledges or denies the receipt of the transmitted data.

In contrast, the transport control protocol (TCP) represents a common connection-oriented protocol. In the case of TCP, like UDP, two processes in two nodes communicate via sockets. However, in addition to port and addressing information, TCP includes a sequence number to each byte transmitted and expects a positive acknowledgment (ACK) from the receiving node. If the ACK is not received within a timeout interval, the data is re-transmitted. Moreover, the receiving node, when sending an ACK back to the sending node, also indicates to the sending node the number of bytes it can receive beyond the last received data segment without causing overrun and overflow in its internal buffers.

Figure 5:
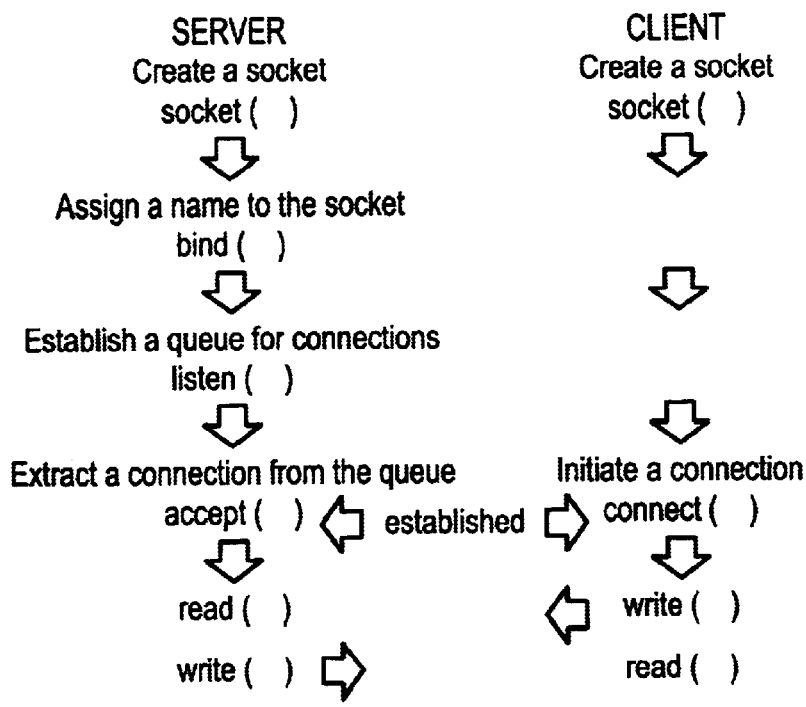
FIG. 5 is a sequence diagram of a typical, connectionless Transport Control Protocol (TCP) based point-to-point communications sequence between a client and a server.

FIG. 5 depicts a typical TCP client-server communication sequence. As shown in the figure, initially, both the client and the server establish a socket through which each can communicate. Additionally, both the client and the server assign a name to the established socket. Having established a connection, the server can establish a queue for connections. A requesting client can establish a connection by inserting into the queue, the request for communication. The server can "listen" to the queue and can identify the request for communication. Having identified a request, the server can accept the request by notifying the requesting client. Subsequently, a connection can be established.

As such, in TCP, each of two communicating nodes are cognizant of each other's data transmission activities. Specifically, using "handshaking" techniques, the sending node can inform the receiving node when data has been transmitted. The receiving node can acknowledge the receipt of the transmitted data by transmitting an "ACK" signal to the sending node, or can deny the receipt of the transmitted data by transmitting a "NACK" to the sending node. As shown in the figure, the client can "write" the data to the socket. Subsequently, the server can "read" the data and write either an "ACK" or "NACK" back to the client. The client can read the server's response and, depending on the server's response, can handle the transmission failure.

Figure 6A:
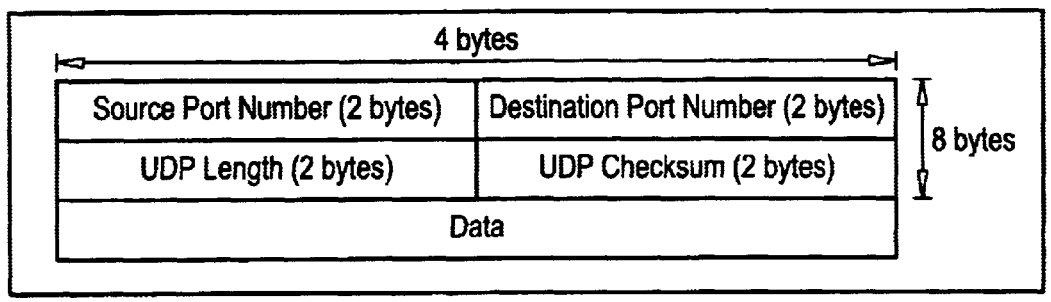
FIGS. 6A and 6B are schematic diagrams of a UDP packet and a TCP packet, respectively.
Figure 6B:
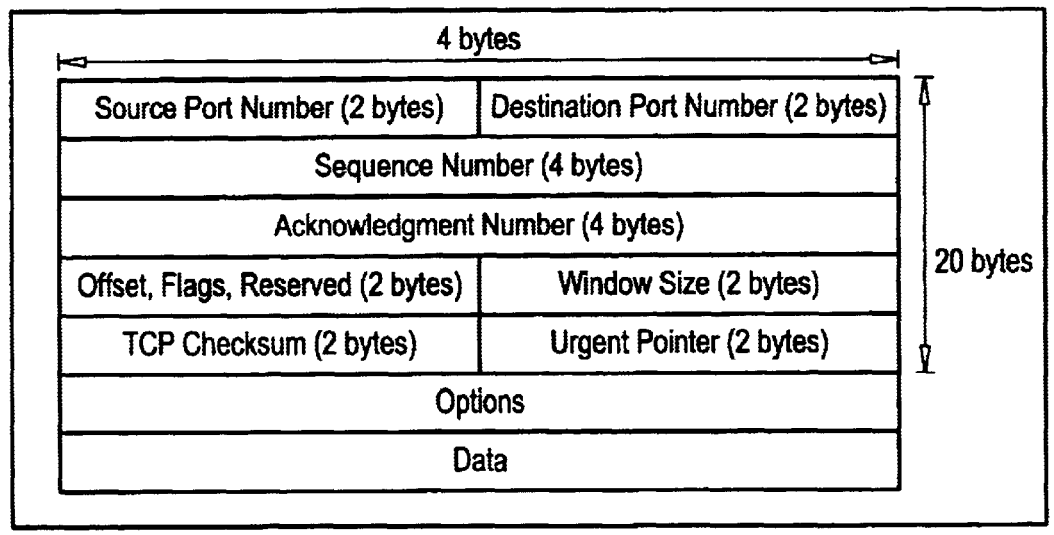

FIGS. 6A and 6B, taken together, illustrate the relative strengths and inefficiencies of the TCP and UDP protocols. The UDP layer, unlike the TCP layer, can be regarded as extremely thin and consequently has a low overhead (8 byte header). Hence, UDP messages are smaller and more efficient than TCP messages. However, UDP does not provide error checking or guarantee delivery. TCP, on the other hand, does provide error checking and delivery guarantees. In consequence, though, TCP messages are bigger (20 byte header) and less efficient. Significantly, the maximum frame size in UDP, depending upon the operating system, can be 1 Kilobyte (K). In contrast, the maximum frame size in TCP can substantially exceed the frame size associated with UDP. In several operating systems, the maximum TCP frame size is 32 K. Hence, the most efficient choice between UDP and TCP lies within the specific needs of the application-size versus speed.

In the preferred embodiment of the inventive method, both connection-oriented and connectionless transport techniques can be used for distributing file updates and performing file reconciliation across a distributed data network. For files distributed across a small set of nodes, connection-oriented messages, for example TCP messages, can be exchanged between the primary distributor having the prime copy of the updated file, and each client node having an image of the prime copy of the file. In contrast, broadcast connectionless messages, for example UDP messages, can be used to distribute updates across a large number of client nodes in order to maximize network and processor bandwidth.

Figure 7:
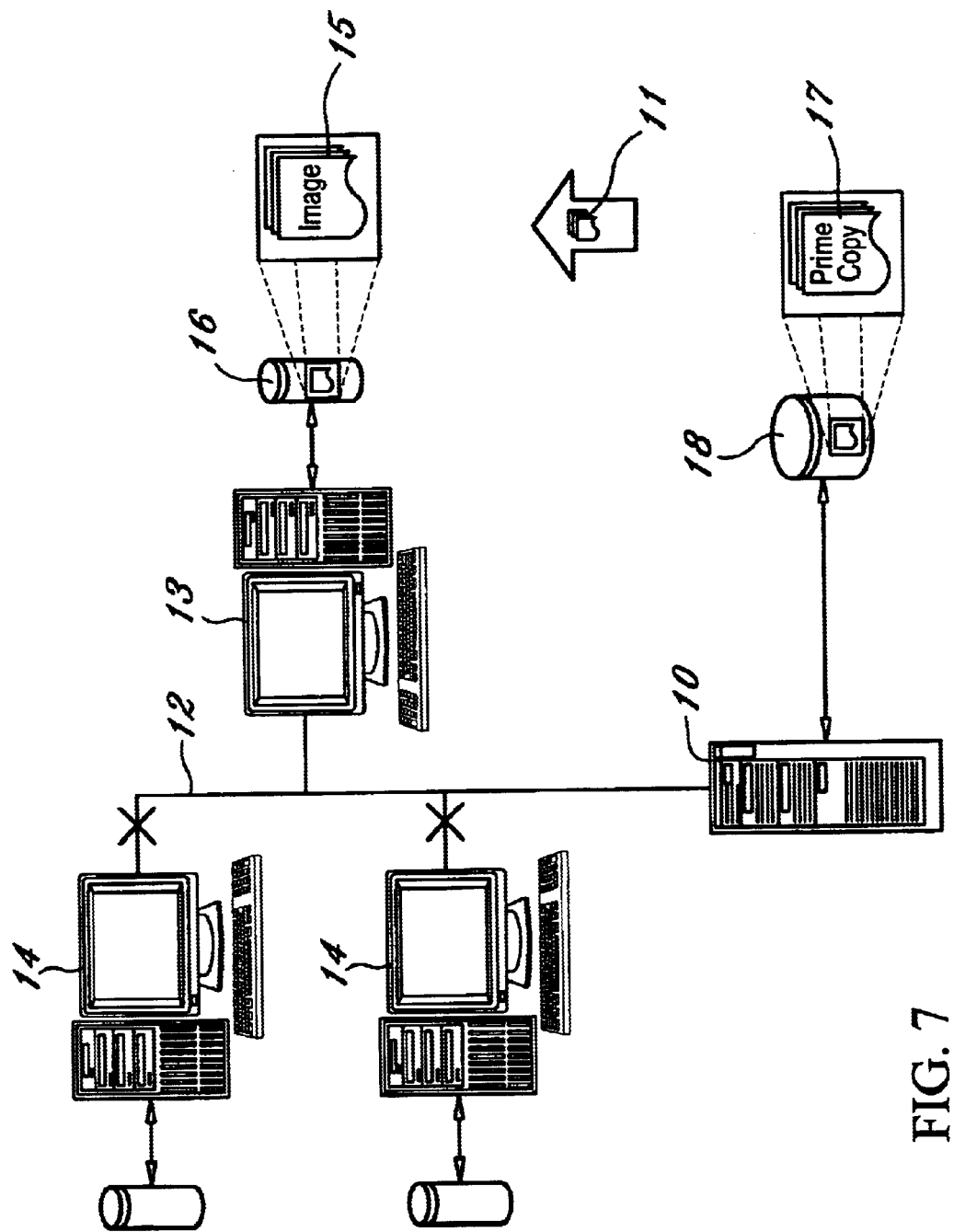
FIG. 7 is a schematic representation of a re-synchronization process typical of a distributed data system.

In the case of the Distributed Data Services software platform, a method for adaptive file transfer can provide a substantial benefit when large blocks of data are sent in messages from the primary distributor to client nodes. For example, FIG. 7 illustrates a re-synchronization process typical of the Distributed Data Services software platform. As shown in FIG. 7, when a primary distributor 10 transmits a copy of an entire file 11 across the distributed data network 12 to an active subordinate client node 13 (as opposed to an inactive subordinate client 14) in order to synchronize the content of the image copy 15 of the file in fixed storage 16 on the active subordinate client 13 with the content of the prime copy of the file 17 in the fixed storage 18 of the primary distributor 10, potentially large blocks of data can be transmitted. For instance, in a retail POS system, the prime copy of the file can be a translation table referenced during bar code scanning. The translation table can have a list of all retail goods in a retail store's inventory. As such, the translation table can exceed 50 to 100 Megabytes in size.

FIG. 8 illustrates a preferred algorithm for performing adaptive file distribution. Although, the algorithm, shown in the figure as source code, employs structure comparable to ANSI C, one skilled in the art will recognize that the source code is "pseudo-code". In that regard, a programmer skilled in the art preferably can implement the illustrated algorithm using any of several available programming languages, for example, C, C++, Java, Fortran and the like. In the preferred embodiment, the inventive algorithm is implemented using C++.

From FIG. 8, it will be apparent that the algorithm, as shown, preferably is performed by a transmission process (for example the transmission process 6 of FIG. 2) included with the Distributed Data Services software platform. In fact, advantageously, the Distributed Data Services software platform employs a separate thread for performing the transmission process. The process continuously waits for a reference to a file to be added to a transmission list of files (for example. the transmission file list 5 of FIG. 2) in an attempt to identify new files for transmission. When a service requires a file to be transmitted from the primary distributor to a subordinate client node, the service merely inserts a reference to the file in the transmission list. In consequence, the transmission process can sequentially traverse the list, transmitting each identified file.

For each file in the transmission list, the transmission process can retrieve the size of the file. Subsequently, the transmission process can segment the file into 32 K segments of data. Prior to transmitting the 32 K segment of data, however, the transmission process first determines an appropriate transport protocol. Specifically, in the preferred embodiment, the transmission process chooses between connection-oriented TCP and connectionless UDP. Still, the invention is not limited in this regard. Rather, the transmission process can choose between any connection-oriented and connectionless transport protocol.

Experimentally, it has been determined that if a file to be transmitted, is to be transmitted to four or fewer subordinate client nodes, a connection-oriented protocol is an optimal choice in view of the larger frame size capabilities of the TCP protocol. Specifically, when transmitting a 5 MB file from the primary distributor to four or fewer subordinate client nodes, using TCP rather than UDP resulted in a 33% performance improvement. Moreover, in using TCP, fewer data segments are transmitted across the distributed data network because TCP is a connection-oriented, point-to-point protocol as opposed to UDP which is a broadcast, connectionless protocol. Finally, in choosing TCP over UDP for transmitting a 5 MB file to four or fewer subordinate client nodes, the use of processor resources on each subordinate client node is minimized in that subordinate client nodes not receiving the transmission are no longer required to identify the header of each transmitted packet to determined whether the subordinate client node was an intended recipient.

Thus, in the inventive method, the identity and number of active subordinate nodes actively requesting the updated file preferably is determined. The determination can be made by counting the number of subordinate client nodes which have requested the file at the time the file is updated on the primary distributor. Notwithstanding, the invention is not limited in this regard. Rather, in an alternative embodiment, the primary distributor can actively poll the distributed data network at the time of transmission, to determine the number of active workstations attached to the distributed data network.

From the determination of the number of active subordinate client nodes on the distributed data network, the transmission process can choose an appropriate transmission protocol. Where the number of active subordinate client nodes exceeds four, UDP based broadcast messaging can be chosen. Notably, in choosing UDP, as opposed to TCP, the segment can be fragmented into 1 K slices of data. Conversely, where the number of active subordinate client nodes is four or less, TCP based point-to-point messaging can be chosen. Unlike UDP, in the TCP solution, the 32 K segment need not be fragmented into slices of data. Rather, the entire 32 K segment can be transmitted to the target subordinate client node.

Consequently, for example in a retail store environment, during off-peak hours when merely four or less POS terminals are active, a TCP based point-to-point messaging solution can be selected for updating translation table data. However, during peak store hours, when more than four POS terminals are active, a more efficient UDP based broadcast messaging solution can be chosen. Hence, by intelligently choosing an appropriate transport protocol, the inventive adaptive file distribution algorithm can optimize network and processor bandwidth in a distributed data network.

What is claimed is:

1. A method for adaptively selecting a transport protocol for transmitting data segments across a distributed data network comprising a primary distributor and at least one subordinate node comprising the steps of:

determining the number and identity of subordinate nodes on said network that will receive an initial transmission of a prime copy of said data segment;

selecting a data transport protocol according to said number of subordinate nodes, said transport protocol selected from the group consisting of a connection-oriented protocol and a connectionless protocol; and, transmitting said initial transmission of said prime copy of said data segment to said determined subordinate nodes using said selected transport protocol.

2. The method according to claim 1, wherein said determining step comprises the steps of:
   initializing a counter in said primary distributor;
   receiving a request for updated data from subordinate nodes on said network; and,
   responsive to said request, incrementing said counter.

3. The method according to claim 1, wherein said determining step comprises the steps of:
   initializing a counter in said primary distributor;
   identifying each active subordinate node on said network, and,
   for each identified active subordinate node, incrementing said counter.

4. The method according to claim 1, wherein said selecting step comprises the steps of:
   selecting a connectionless transport protocol if said number of subordinate nodes exceed four nodes; and,
   otherwise selecting a connection-oriented transport protocol.

5. The method according to claim 1, wherein said connectionless transport protocol is the Universal Datagram Protocol.

6. The method according to claim 1, wherein said connection-oriented transport protocol is the Transport Control Protocol.

7. The method according to claim 1, wherein said transmitting step comprises the steps of:
   if a connectionless transport protocol is selected, broadcasting said data segment to said subordinate nodes using said connectionless transport protocol; and,
   otherwise establishing a point-to-point connection with each said subordinate node and writing said data segment to each said connection.

8. The method according to claim 7, wherein said broadcasting step comprises the steps of:
   fragmenting said data segment into one kilobyte (1 K) slices of data; and,
   repeatedly transmitting said 1 K slices of data onto said network until all said 1 K slices have been transmitted.

9. A method for adaptively distributing file updates and performing file reconciliation in a distributed data network comprising the steps of:
   updating a prime copy of a file residing on a primary distributor;
   responsive to said update, identifying at least one subordinate node requesting an initial transmission of said updated file;
   if said identified subordinate nodes exceed a threshold number, broadcasting said initial transmission of said updated file to said identified subordinate nodes; and,
   otherwise establishing a point-to-point connection with each said identified subordinate node and transmitting said initial transmission of said updated file to each said identified subordinate node using said point-to-point connection.

10. The method according to claim 9, wherein said broadcasting step comprises the steps of:
    if said identified subordinate nodes exceed four active subordinate nodes, selecting a connectionless transport protocol for transmitting said updated file to said identified subordinate nodes; and,
    transmitting said updated file to said identified subordinate nodes using said connectionless transport protocol.

11. The method according to claim 10, wherein said connectionless transport protocol is the Universal Datagram Protocol.

12. The method according to claim 9, wherein said establishing step comprises the steps of:
    if said identified subordinate nodes does not exceed four subordinate nodes, selecting a connection-oriented transport protocol for transmitting said updated file to said identified subordinate nodes;
    establishing a connection with each said identified subordinate node; and,
    transmitting said updated file to each said identified subordinate nodes using said connection-oriented transport protocol.

13. The method according to claim 12, wherein said connection-oriented transport protocol is the Transport Control Protocol.

14. A computer apparatus programmed with a routine set of instructions stored in a fixed medium for adaptively selecting a transport protocol for transmitting data segments across a distributed data network comprising a primary distributor and at least one subordinate node, said programmed computer apparatus comprising:
    means for determining the number and identity of subordinate nodes on said network that will receive an initial transmission of a data segment;
    means for selecting a data transport protocol according to said number of subordinate nodes, said transport protocol selected from the group consisting of a connection-oriented protocol and a connectionless protocol; and,
    means for transmitting said initial transmission of said data segment to said determined subordinate nodes using said selected transport protocol.

15. The computer apparatus according to claim 14, wherein said determining means comprises:
    means for initial a counter in said primary distributor;
    means for receiving a request for updated data from subordinate nodes on said network; and,
    means responsive to said request, incrementing said counter.

16. The computer apparatus according to claim 14, wherein said determining means comprises:
    means for initializing a counter in said primary distributor;
    means for identifying each active subordinate node on said network; and,
    means for incrementing said counter for each identified active subordinate node.

17. The computer apparatus according to claim 14, wherein said selecting means comprises:
    means for selecting a connectionless transport protocol if said number of subordinate nodes exceed four nodes; and,
    means for otherwise selecting a connection-oriented transport protocol.

18. The computer apparatus according to claim 14, wherein said connectionless transport protocol is the Universal Datagram Protocol.

19. The computer apparatus according to claim 14, wherein said connection-oriented transport protocol is the Transport Control Protocol.

20. The computer apparatus according to claim 14, wherein said transmitting means comprise:

means for broadcasting said data segment to said subordinate nodes using said connectionless transport protocol if a connectionless transport protocol is selected; and, means for otherwise establishing a point-to-point connection with each said subordinate node and writing said data segment to each said connection.

21. The computer apparatus according to claim 20, wherein said broadcasting means comprises:

means for fragmenting said data segment into one kilobyte (1 K) slices of data; and, means for repeatedly transmitting said 1 K slices of data onto said network until all said 1 K slices have been transmitted.

\* \* \* \* \*